United States Patent Office 3,426,872
Patented Feb. 11, 1969

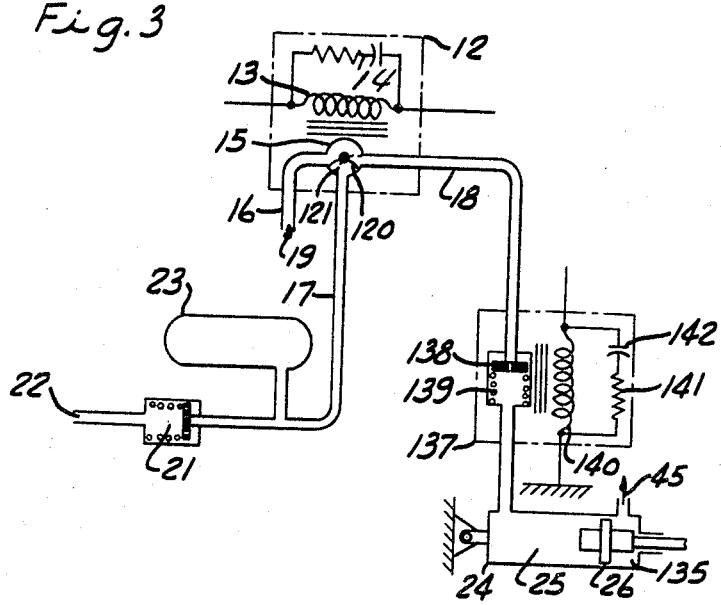
Fig. 3
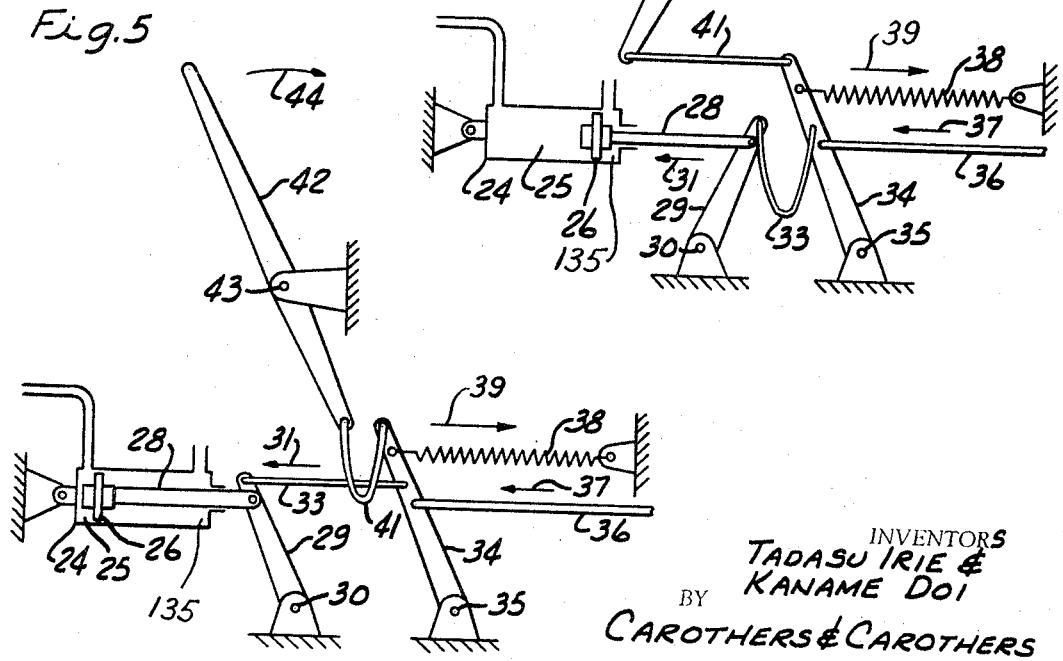
Fig. 4
Fig. 5

3,426,872
AUTOMATIC BRAKE WITH SPEED AND
THROTTLE CONTROLS
Tadasu Irie, Toyonaka, and Kaname Doi, Ibaragi, Japan, assignors to Sumitomo Electric Industries, Ltd., Osaka, Japan, a company of Japan
Filed June 29, 1966, Ser. No. 565,037
Claims priority, application Japan, Oct. 18, 1965, 40/63,796; Dec. 25, 1965, 40/80,236; Mar. 15, 1966, 41/16,238
U.S. Cl. 192—.094         14 Claims
Int. Cl. F16d 67/04, 71/00; B60t 11/10

ABSTRACT OF THE DISCLOSURE

An automatic brake control for a motor vehicle wherein the parking brake is actuated by a fluid, electric or electromagnetic motor preferably driven from the vehicle engine or its associated parts and controlled by an electric circuit having a plurality of switches arranged and constructed to engage the parking brake upon the vehicle coming to a stop with the throttle control in engine idle position. A speed regulator is provided to selectively regulate the response time required for the motor to fully engage the parking brake with minimum time required upon the application of the vehicle foot brake to a predetermined limit. Upon the failure of the hydraulic or mechanical foot brake as determined by displacement thereof beyond predetermined limit, the parking brake is actuated in minimum time regardless of the state of motion of the vehicle.

---

This invention relates to a method of automatic brake control for automobiles and the like and apparatus therefor.

As is widely known, when accelerating the present day automobile from its parked position on a slope, it is necessary to release the hand brake for parking properly so as to prevent the automobile from moving backward owing to the inclination of the road. This operation requires experienced skill and is often prone to give rise to engine stall or other troubles. Many of the automobile accidents at railroad crossings are attributable to engine stall due to this difficulty. This operation also constitutes a source of fatigue of the automobile driver who drives an automobile all day in urban areas.

One object of the present invention is to provide a method of automatically effecting an appropriate control of the parking brake for the purpose of making easy starts on a slope which requires dexterity and which involves hazards as already mentioned and to alleviate the fatigue of the driver.

Another object of the present invention is to provide a concrete apparatus for automatically effecting said appropriate control.

Still another object of the present invention is to provide a method and apparatus for preventing dangers through automatic operation of the brake in the event an unknown fault such as vapour lock, oil leakage, etc. has taken place in the foot brake hydraulic system.

Still another object of the present invention is to provide a mechanism which enables the method and apparatus having the above mentioned objects to operate without mutual interference with the hand brake mechanism already in use.

Still another object of the present invention is to provide a mechanism which controls the time required for effecting the automatic control in order to give greater practical value to the method and apparatus having the above mentioned objects, eliminating the uncomfortable shocks to which drivers and passengers are liable to be subjected when the brake is applied.

Now we shall explain the contents of the present invention in detail, making reference to the appended drawings.

FIGURE 3 is a diagrammatic view showing only the braking speed control circuit in another embodiment.

FIGURE 4 and FIGURE 5 are diagrammatic views showing examples of the structure of the hand brake lever and linkage according to the present invention.

In all of these figures like parts are represented by like numerals.

Figure 1:
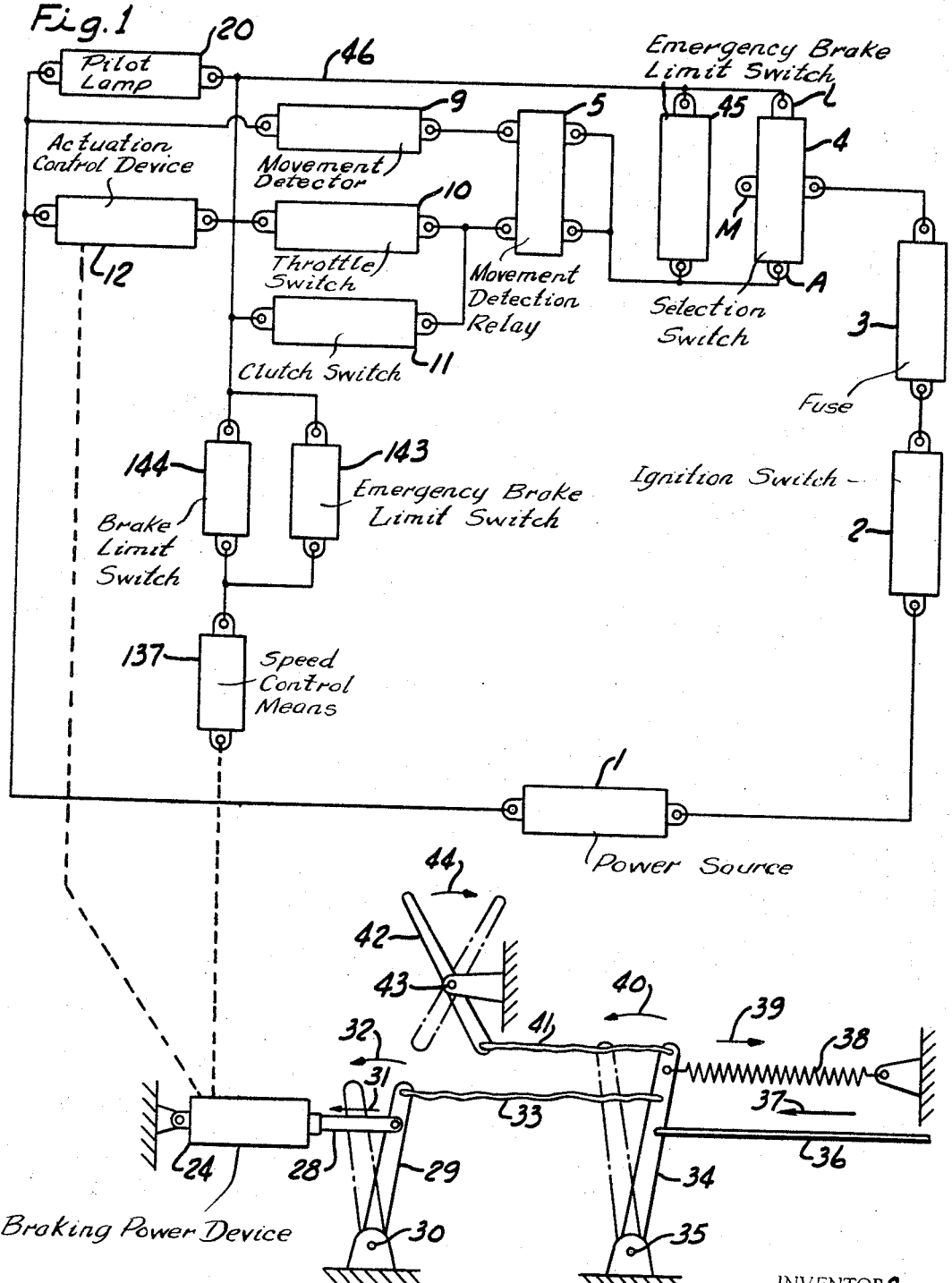
FIGURE 1 is a block diagram showing the operational principle of the method and apparatus of the present invention.

In FIGURE 1, 1 denotes the electric power supply source or storage battery aboard the automobile, 2 the engine key switch having function common to both the ignition circuit of the engine and the electric circuit of the present apparatus which closes upon insertion of the key; 3 the fuse carried aboard the automobile as a safety device for the electric circuit; 4 the switch which enables the driver freely to select at his own will and switch in any of the three circuits of automatic brake A, hand brake M and permanent brake L; 5 the relay, the switch of 5 being opened when the vehicle movement detector 9 detects the forward or backward movement of the automobile and the switch of 5 being closed when the forward or backward movement comes to a stop; 10 the accelerator switch installed attachable to the accelerator pedal or throttle control or a mechanism interlocked with it which opens immediately before the engine is accelerated from the idling revolutions by the application of the accelerator pedal and closes when the pressure applied to the accelerator pedal is removed; 11 the clutch switch installed in parallel with the accelerator switch 10, is attachable to the clutch pedal or a mechanism interlocked with it and operates in response to the displacement of the clutch mechanism or change in pressure. The clutch switch remains closed while the clutch is disengaged by the pressure applied to the clutch pedal and opens at or near the instant the clutch is engaged, it being possible to regulate the point of its activation. The brake switch 45 for emergency braking, is installed attachable to the foot brake pedal or lever or a mechanism interlocked with it in such a way that it closes, independent of the condition of the switch of the relay 5 and the accelerator and/or clutch switch, when, for instance, the foot brake pedal has had displacement more than specified in case a fault has taken place in the pressure circuit of the hydraulic mechanism or in the energy transmission circuit of the mechanical brakes, and opens when the application of the pressure to the foot brake lever is brought to and end. This brake switch 45 is installed for the purpose of preventing accidents due to vapour lock or oil leakage or others, so that it may be omitted where there is no fear of such accidents. 12 is the brake control device for controlling the operation of the braking power device 24; 28 the traction rod of the braking power device; 33, 36, and 41 the brake cords or brake rods; 29 the swing lever revolving around the center 30; 34 the intermediary swing lever revolving around the center 35; 42 the hand brake lever; and 38 the return spring which operates when releasing the parking brake. The braking power device 24 may give braking force to the brake, using oil pressure power, positive air pressure power, negative air pressure power, electromagnetic power, etc. for a power source. The braking power device together with its associated components is referred to as the actuating means. 20 denotes the pilot lamp which indicates the activation of the present device. 46 denotes the short circuit which bypasses the relay 5 and holds the brake control device 12 in a permanently activated condition directly from the selection switch 4. It functions as a safety device when the automobile is temporarily parked or parked for a long time. 137 denotes the braking speed control valve and 143 and 144 the switches directly connected thereto. These are installed in the braking system when necessary. This braking speed control valve has a unique object of its own, which is explained in detail below.

When a moving automobile comes to a stop, if the initial point of operation of the movement detector is set at zero speed, a lag takes place in the braking response time required between the point of brake control actuation and the point of brake effectuation, so long as the time required for braking by the control valve and the speed of the piston in the power cylinder of the braking power device are finite. It is consequently desirable that the starting point of brake control should be set at a point of infinitesimal or minimal speed before the zero speed, so that the automatic brake may complete its braking effect the moment the automobile comes to a stop. However, the time required between the starting point of brake application and the point of completion of braking application does not always coincide with the time required between the point of set speed of the movement detector and the point of zero speed of the automobile, depending on the negative acceleration value of the vehicle. If the time required for the automatic braking device is shorter than the time required between the point of set speed of the running detector and the point of zero speed of the automobile, then the automatic braking gives an unpleasant shock. It is necessary for this reason that the time required for actuation of the automatic braking device be made equal to the time required between the point of set speed of the running detector and the point of zero speed of the automobile at the minimal deceleration speed practically used by the automobile. On the other hand, if the deceleration value is great under such a set condition, the automatic brake takes effect after some time has elapsed and after the automobile has come to a stop. Where it is desired to ensure the braking effect immediately after stopping or to obtain an emergency braking effect, therefore, it is necessary to have the automatic brake take effect immediately and to reduce the braking response time to a very minimum. The control valve 137 and switches 143 and 144 of the present invention are provided to attain the object of satisfying the above requirements.

143 denotes the emergency switch installed attachable to the brake pedal, this switch closing only at the same time as the emergency brake switch 45 closes and these switches opening simultaneously when the pressure on the brake pedal is removed.

144 denotes the brake switch installed attachable to the hydraulic circuit of the main braking system. Switch 144 is preferably of the pressure activation type set for closure at a point near the upper limit of the hydraulic pressure ordinarily required to brake the automobile. An equivalent switch which operates in proportion to the mechanical displacement of the brake may be substituted.

137 denotes the speed control valve which controls the speed of piston in the power cylinder. When 137 is charged with electric current, the operating speed of the piston is increased, while its operating speed decreases to the set speed for ordinary use when the electric current is stopped.

Even when the moving automobile has been slowed down and stopped or has been brought to a stop by pressing the pedal of the main braking system and electric current comes to flow in the automatic brake control circuit 1→2→3→4→5→10 or 11→12→1 to give braking power to the power cylinder, the braking effect will not be obtained until the time for effective braking has elapsed. In case it is desired to accelerate the braking effect, however, electric current will flow in the speed control circuit 1→2→3→4→5→10 or 11→144→137→1 and accelerate the operating speed of the piston if the pedal of the main braking system is pressed beyond the set pressure of the brake switch 144 immediately after the speed of the automobile reaches zero.

If the pedal of the main or service braking system obtains a displacement greater than the normal operating range owing to oil leakage, vapour lock, etc., when it is pressed as required while driving, the emergency switch 45 and emergency switch 143 close, regardless of whether the switches of the running detector 9 and relay 5 are closed or open, and cause electric current to flow in the emergency braking circuits 1→2→3→4→45→12→1 and 1→3→4→45→143→137→1, bringing about braking effect in a short time for effective braking. If the pressure on the pedal of the main braking system is removed, the emergency switches 45 and 143 open to break the electric current in the emergency braking circuits and the brake is deactivated.

With the above-described devices and method in use, the following operations will be performed in various conditions of automobile driving.

(A) When it is parked:

As the engine key is removed, the key switch 2 is open, and no current flows in the electric circuit 1→2→3→4→5→10, 11→12→1, no matter how the accelerator switch 10 and clutch switch 11 are handled. The brake control device 24 is therefore in a deactivated condition. However, as the hand brake lever 42 is pulled on the 44 side around the center 43, the parking brake is activated and prevents the automobile from moving forward and backward.

(B) When the engine is started:

If the key is inserted into the key switch 2 to start the engine, with the gear shift lever of the transmission in the neutral position, the key switch closes and, as the movement detector 9 is in an inactive condition because the automobile is at a stop, the switch of the relay 5 responding thereto is closed.

In consequence, unless the accelerator switch 10 is opened by pressing the accelerator pedal, electric current flows in the circuit 1→2→3→4→5→10→12→1, so that the braking power device 24 is activated and, along with the hand brake lever 42, pulls the braking cord 36 in the direction of the arrow 37. The parking or supplementary brake being thus in operation, the braking power device 24 prevents the brake from being deactivated even if the hand brake lever is pulled in the direction opposite to that of the arrow 44.

(C) When the automobile begins moving (forward and backward):

When the clutch pedal is pressed and the gear shift lever is put to the position desired by the driver, such as the forward position 1 or the backing position, electric current flows in the circuit 1→2→3→4→5→11→12→1, no matter whether the accelerator switch 10 is open or not, because 2, 3, 4, 5 and 11 are closed. The braking power device 24 is thus activated and, as already mentioned, the parking brake is not released. Then, if the accelerator pedal is pressed lightly or strongly while releasing the clutch pedal gradually, the clutch switch 11 is opened the instant the clutch is coupled and, as the accelerator switch 10 is also open, the current flowing in 1→2→3→4→5→10, 11→1 is broken and the brake control device 12 automatically deactivates the braking power device 24, releasing the brake and causing the automobile to start.

(D) When the automobile is running (forward and backward):

As long as the automobile continues running, the switch of the relay 5 is open by the action of the movement detector 9, so that the electric current does not flow in the circuit 1→2→3→4→5→10→11→12→1, irrespective of the condition of the engine key switch 11. The braking power device 24, therefore, is not activated and consequently the supplementary or parking brake will not interfere with the movement of the automobile.

(E) Temporary stop:

When the automobile is brought to a temporary stop by pressing the brake pedal with the engine revolving, either the gear shift lever is in the neutral position or the position for a forward or backward drive and the clutch pedal is pressed. If the accelerator pedal is in the released position in addition, electric current flows in the circuit 1→2→3→4→5→10, 11→12→1 for the reason already mentioned and the braking power device 24 is activated, so that the parking brake automatically effects braking. The parking brake will continue braking the movement of the automobile even after the pressure on the foot or service brake pedal is removed, unless the accelerator pedal is again pressed and the operation mentioned under C is performed.

In case the speed control valve 137 is provided, the brake switch of 144 does not close upon pressing the brake pedal to a displacement within the normal range and causes no current to flow in the speed control valve. In this instance, therefore, the speed of the brake taking effect is slow and does not bring the automobile to a sudden stop with a shock.

(F) Parking:

If the hand brake lever 42 is pulled in the direction of the arrow 44 while the automobile is in the condition of E, it can be operated by much less power than the hand brake lever of the conventional type because the traction rod 28 of the braking power device 24 has already moved in the direction of the arrow 31 and activated the parking brake. If the engine key is removed after pulling the hand brake lever 42 in the direction of the arrow 44 and the change-over switch 4 is put to the permanent braking position L, electric current will flow in the circuit 1→3→4→46→12→1 as soon as the engine starts and activates the braking power device 24 in such cases as the engine is started by a thief with a mock key or by short-circuiting the ignition circuit. As the parking brake is thus in operation, the automobile will not move even if the accelerator pedal is pressed. If the change-over switch 4 is installed at a location known to the driver only, it therefore will be an effective device against thievery.

(G) At the time of emergency braking:

If the service or foot brake pedal is pressed when a fault has taken place with the braking energy or its circuit, as when the hydraulic circuit of the hydraulic brake system is out of order, the brake switch 45 is closed. Consequently, the braking power device 24 is activated and the automobile is braked by the supplementary or hand brake as electric current flows in the circuit 1→2→3→4→45→12→1, even if the oil pressure on the driven side is not enhanced enough to effect braking and the electric circuits 1→2→3→4→5→9→1 and 1→2→3→4→5→10, 11→12→1 are open. If the foot brake pedal is released until it is out of the range of operation of the brake switch 45, the electric current in the circuit 1→2→3→4→45→12→1 is broken and the hand brake is released.

In case the speed control valve 137 is provided, the switch 143 closes at the same time as the switch 45 closes and causes electric current to flow in the valve 137, so that the braking takes effect at a high speed and brings the automobile to a sudden stop, thus ensuring emergency braking.

The pilot lamp 20 in FIGURE 1 may be eliminated without detrimentally affecting the function of this apparatus at all. Also, even if both or either one of the circuits 46 or 45 are eliminated, the function inherent in the automatic brake control apparatus is not lost, it being only the function of the eliminated circuits or circuit that is lost.

The drive or vehicle movement detector may be installed in any part of the rotating parts from the rear of the clutch mechanism provided midway between the engine and the change gear to the driving wheel or in the rotating part of the driven wheel to detect both the positive and negative revolutions. Or, instead of this, the forward and backward movements may be detected by separate devices, the forward movement being detected from the movement of the hand of the speedometer, or the fluid joint, oil pressure on the driven side of the fluid transmission, etc. and the backward movement from the closure of the back drive lamp circuit. Either of the above-mentioned methods of drive detection will not impair the function of the present invention at all.

As regards the accelerator switch 10 and clutch switch 11, it is possible to open and close these switches by utilizing the displacement in the linkage mechanism or change in pressure, no matter whether the drive transmission method is of the mechanical type or is of the pressure type. In case the automobile is one provided with a fluid transmission, it goes without saying that no clutch switch 11 is necessary.

Connecting rods, cords, etc. may be used for the braking power transmission mechanisms 33 and 41 from the braking power device 24 and the hand brake lever 42 to the parking brake. However, it is preferable to use flexible members for 33 and 41 in order that 24 and 42 may attain their respective objectives both independently from each other and simultaneously without affecting the operation of each other.

The present invention will function effectively by adopting such a combination of relations between the switches of the drive detector 9 and the relay 5 that the switch of 5 is open while the automobile is running no matter whether the switch of 9 is closed or open, while the switch of 5 is closed while the automobile is at a stop no matter whether the switch of 9 is open or closed.

Figure 2:
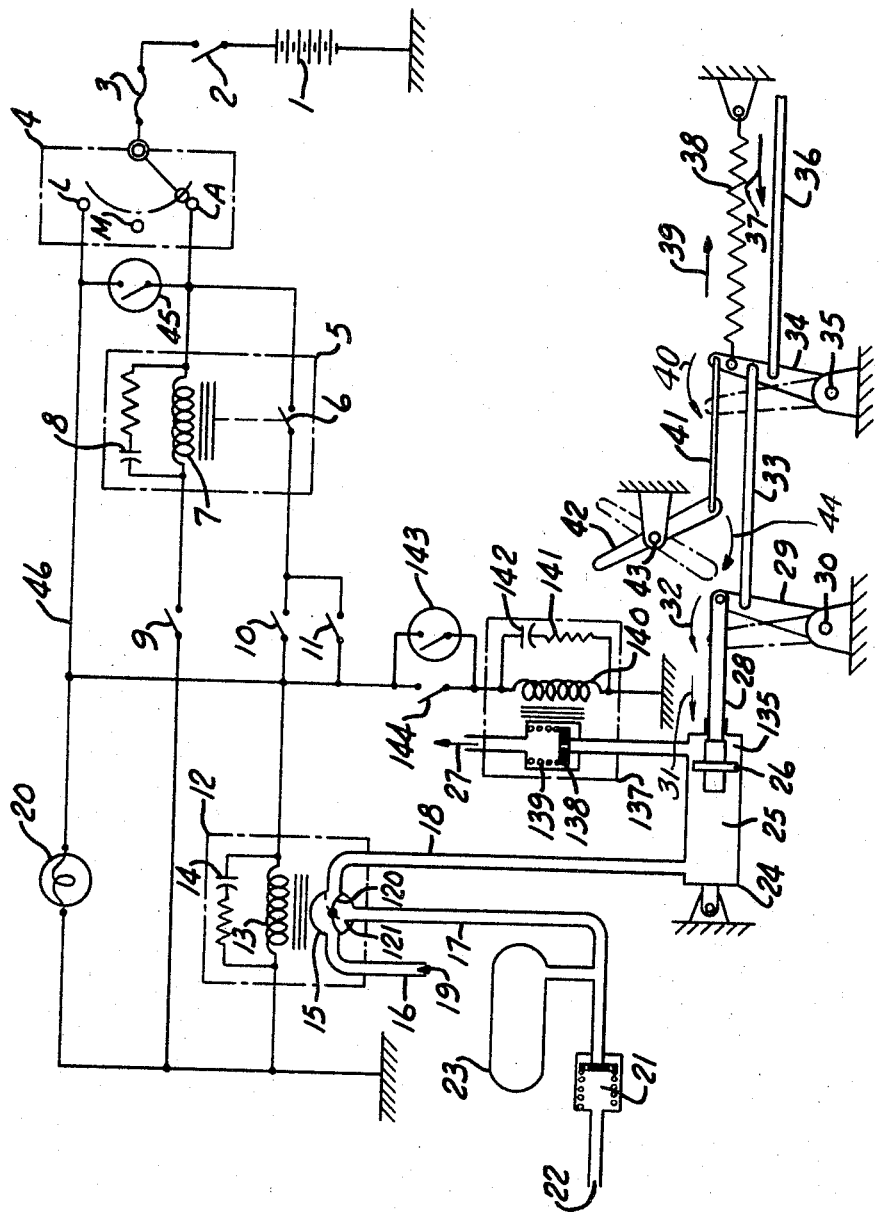
FIGURE 2 is a schematic diagram illustrating the structure of an embodiment of the present invention.

FIGURE 2 shows an embodiment of the arrangement shown in FIGURE 1. 1 denotes the electric supply source on board the automobile, 2 the key switch in the automobile, 3 the fuse aboard the automobile, 4 the change-over or selection switch which can be switched freely at the will of the driver, A being connected to the circuit of the automatic brake, L to the circuit of the permanent brake and M to the circuit of the manual hand brake.

5 denotes the relay which opens and closes a part of the electric circuit 1→2→3→4→5→10→11→12→1 in response to the opening and closing of the drive detector 9. It consists of coil 7, switch 6, condenser 8, etc. As electric current flows through the coil 7 or not, the switch 6 is closed or opened. 8 is a retard device for the purpose of preventing the switch 6 from responding sensitively to the oscillating opening and closing of the electric circuit of the drive detector.

The accelerator switch 10 and the clutch switch 11 are just as stated with reference to the principle shown in FIGURE 1. 12 is the brake control device and consists of coil 13, bypass circuit 14, change-over switch 15, etc. The change-over switch 15 functions to connect the passage pipes 17 and 18 and close 16 when electric current flows in the coil 13 and to connect the passage pipes 16 and 18 and close 17 when no current flows in the coil 13. When the current in the coil 13 is broken, the input side gets a high voltage the moment the current is broken and affects the other parts of the circuit detrimentally. The bypass circuit 14 is therefore provided in order to have the voltage come down through 14 when a specified voltage has been reached.

Both the system in which the switch 6 is closed when electric current flows in the drive detection circuit 1→2→3→4→7→9→1 and the system in which the switch 6 is closed when no electric current flows in the drive detection circuit 1→2→3→7→9→1 can let the present invention function satisfactorily. Because of the less consumption of electric power, however, the first-mentioned system is preferable.

In such a condition of the automobile that it is at a stop and the key is inserted in the key switch 2 to start the engine, with the change gear in the neutral position, and with the accelerator pedal left unpressed, all of the key switch 2, relay switch 6 and accelerator switch 10 are closed, so that electric current flows in the automatic brake control circuit 1→2→3→4→6→10→13→1 and the control valve 15 connects the passage pipes 17 and 18 by the excitation of the coil 13. As the other end 22 of the passage pipe 17 is connected to the suction pipe of the engine, a negative pressure is always maintained on the average as long as the engine revolves, so that the interior 25 of the cylinder of the braking power device 24 has a negative pressure and the piston 26 and the traction rod 28 fixed thereto are pulled in the direction of 31, sucking in atmospheric air from 29 at the same time. The pressure in the suction pipe of the engine is constantly changing according to the number of revolutions of the engine and the conditions of load and sometimes becomes positive. In order to maintain a lowest pressure attainable in the passage pipe 17 at all times, therefore, the check valve 21 is provided between the suction pipe of the engine and the control valve 15, so that the passage is closed by the check valve when pressure is higher on the 22 side than on the 17 side, while the 17 and 22 sides connect only when pressure is lower on the 22 side than on the 17 side and the pressure difference is greater than the force of the spring provided in the check valve 21; 23 is the negative pressure tank which stores negative pressure force. It is provided for the purpose of storing negative pressure force sufficient to make 25 have a pressure low enough to have the passage pipes 17 and 18 connected by the action of the control switch 15 and the piston 26 fully sucked in a short time against the exterior force.

The traction rod 28 of the braking power device 24 is pulled in the direction of 31, when the swing lever 29 pivotally connected thereto turns in the direction of 32 with 30 as a fulcrum and pulls the intermediary cord 33, the intermediary lever 34 connected thereto turning in the direction of 40 around its fulcrum 35 and pulling the brake cord 36 in the direction of 37 against the force 39 of the spring 38. The parking brake connected to 36 is thus given braking force and the automobile is braked.

If the clutch pedal is then pressed, the gear shift changed to a desired position and the accelerator pedal pressed as required for the driving condition, electric current in the automatic brake control circuit 1→2→3→4→6→11→13→1 continues to flow because the clutch switch 11 is closed, even though the accelerator switch 10 is open and the change-over valve 15 maintains the passage through the passage pipes 17 and 18, the automobile being thus kept in a braked condition as mentioned above.

The instant the clutch engages upon releasing the clutch pedal to the required displacement, the clutch switch 11 opens and the electric current in the automatic brake control circuit 1→2→3→4→6→10, 11→13→1 is broken, and the magnetic field of the coil 13 disappear and the control valve 15 connects the passage pipes 16 and 18, closing 17 at the same time, so that the atmospheric air flows into 25 from 19 through 18 and the pressures on both sides of the piston 26 become equal. The force of the spring 38, acting via 34, 33, 29 and 28, pulls the piston 26 in the direction opposite to that of the arrow 31, at which time the brake loses its braking force and the automobile starts moving forward or backward. When the piston 26 moves to the left, air flows out through 22 and when it moves to the right, through 27.

While the automobile is moving, the vehicle movement detector 9 is open and breaks electric current in the drive detection circuit 1→2→3→4→7→9→1. The magnetism of the coil 7 of the relay 5 is deactivated and the relay switch 6 is opened. While the automobile is moving, therefore, no electric current flows in the automatic brake control circuit 1→2→3→4→6→10, 11→13→1, no matter whether the clutch pedal or accelerator pedal is pressed or not and, needless to say, no matter whether the engine key is pulled out or not, so that the braking power device 24 will not be activated and consequently the brake will not acquire any braking force.

If, while the automobile is running, the clutch pedal is pressed and the foot brake pedal is pressed to stop the automobile by the service brakes, the gear shift lever being brought to the neutral position at the same time, the drive detector 9 closes and electri ccurrent flows in the drive detection circuit 1→2→3→4→7→9→1 and the relay switch 6 closes, being activated by the magnetic force generated in the coil 7, so that electric current comes to flow in the automatic brake control circuit 1→2→3→4→6→11→13→1. If the pressure on the clutch pedal is removed and the pressure on the accelerator pedal is also removed, the clutch switch 11 opens but the accelerator switch 10 closes, so that electric current flows in the automatic brake control circuit 1→2→3→4→6→10→13→1 and, due to the magnetism of the coil 13, the change-over valve 15 connects the passage pipes 17 and 18 and closes 16, the braking cord 36 being pulled again in the direction 37 and the brake acquiring braking force and continuing braking.

In case such a fault as oil leakage, vapour lock, etc. suddenly take place in the hydraulic system of the hydraulic braking device during driving and the foot brake pedal is pressed down at that time and displaced more than normal, the braking effect of the hydraulic service braking device is not obtained but the brake switch 45 closes to have electric current flow in the emergency brake control circuit 1→2→3→4→45→13→1, so that the automobile is braked just as in the aforementioned cases. If the foot brake pedal is released, however, the brake switch 45 opens and the force to brake the automobile is removed. As long as the automobile continues running, 6 is open, so that electric current continues flowing in the emergency brake control cricuit regardless of whether 10 or 11 are open or closed and the circuit acts independently of the automatic brake control circuit.

When the automobile is parked, the gear shift lever is put in the neutral position and, before removing the engine key 2, the hand brake lever 42 is turned to the arrow 44 side around 43 as the center and the change-over switch 4 is at the same time switched to the permanent braking circuit contact L. The engine key is pulled out after that. Even if a thief or meddler closes the ignition circuit of the engine by some means or other, electric current flows in the permanent braking circuit 1→4→46→13→1 and the brake gets braking force to brake the automobile as already described, so that the automobile will not start moving, no matter how the change lever, accelerator switch or clutch pedal may be handled, if, therefore, the change-over switch is provided at a location known to the driver only, it will prove to be an effective device to prevent thievery.

In case the speed control valve 137 and switches 143, 144 are provided, the system operates as follows:

The emergency switch 45 and emergency switch 143 are 2-contact S-circuit switches of an integral construction, installed attachable to the main brake lever. The function of 45 and 143 is as described with regard to the principle shown in FIGURE 1, they being a trigger to obtain a braking effect similar to that of the main braking system brought about by the operation of the main brake lever when the function of the main brake system has been impaired or lost.

144 denotes the brake switch of the pressure-operated type installed attachable to the hydraulic circuit of the main brake system. Only when the automobile has come to a complete stop and electric current flows in the automatic brake control circuit, the switch closes if the main brake pedal is pressed so as to enhance the oil pressure to more than the pressure set for the operation of the brake switch 144 and causes electric current to flow in the speed control circuit 1→2→3→4→6→10 or 11→144→ 140→1, and, if the pressure on the main brake pedal is removed to bring down the hydraulic pressure to below the pressure set for the operation of the brake switch, the switch opens and the electric current in the speed control circuit is broken.

137 is the speed control valve which consists of a coil 140, condenser 142, resistor 141, check valve 138, spring 139, etc. One end of the check valve is connected to the Chamber 135 of the power cylinder 24 by means of a pipe and the other end is connected to the atmosphere via a pipe.

When the chamber 25 of the power cylinder 24 has a negative pressure, the piston 26 moves in the direction of the arrow 31 because of the difference between the pressure in 33 and the pressure in 135. The volume of air sent in, because the volume of the space in 135 increases as a result, is controlled by a narrow hole made in the check valve 138, thereby regulating the speed of the movement of the piston 26. When electric current flows in the coil 140, the magnetic field induced thereby causes the check valve 138 to open the passage pipe despite the spring 139 and difference in pressure before and after 138, thereby making it easier to send air into the chamber 135 and remove the restriction imposed on the moving speed of the piston 26.

When air is permitted to flow into the chamber 25 of the power cylinder 24 to atmospheric pressure, the pressures in the chamber 25 and chamber 135 become equal and, because of the return spring provided on the hand brake interlocking mechanism, the piston 26 moves in the direction opposite to that of the arrow 31 and releases the brake connected to their ends via the interlinking mechanisms 28, 29, 33, etc.

As the piston 26 moves in the direction opposite to that of the arrow 31 because of the return spring, the volume of space in the chamber 135 decreases, so that the air in the chamber 135 gets compressed and the check valve 138 opens the passage pipe despite the set pressure of the spring 139 to facilitate and quicken the movement of the piston 26 in the direction to release the brake.

The condenser 142 and resistor 141 are provided for the purpose of eliminating the peak potential generated by self-induction the instant the electric current flowing in the coil 140 is broken and thereby preventing burning of switch contacts in the circuit.

At ordinary times, that is to say, when the brake pedal is pressed in the normal manner, electric current does not flow in the speed control circuit, but the air for the increased volume of space in the chamber 135 due to the displacement of the piston 126 is sent under restriction through the narrow hole provided in the check valve 138 to oppose or dampen the suction force of vacuum in the chamber 25, thereby retarding the piston speed suitably and preventing a shock by abrupt braking. On the other hand, it is sometimes necessary as when the driver desires to immediately stop the automobile on a slope or in a similar situation, that the piston 26 move to the braking side as speedily as possible for prompt braking. In such a case, if the main brake pedal is pressed again to a pressure in excess of the pressure set for the operation of the brake switch 144, the brake switch 144, closes to cause electric current to flow in the speed control circuit and the check valve 138 is opened by the magnetic field of the coil 140 despite the spring 139, so that the volume of air sent into the chamber 135 increases and the moving speed of the piston 26 increases, thereby bringing about effectual braking in a short time. In case of emergency braking, that is to say, in case a fault has taken place in the hydraulic system of the main brake system or other faults as already mentioned, the emergency switch 45 and emergency switch 143, which have set points for operation at a displacement outside of the normal operational range of the main brake pedal, close to cause electric current to flow in the emergency braking circuit to activate the brake control device 12 and the speed control valve 137, bringing about a braking effect in a very short time. The braking effect is removed if the pressure on the main brake pedal is removed.

FIGURE 3 shows the application of the speed control valve 137 in another embodiment. The valve 137 is disposed in and connected to the passage pipe 18. As clearly seen from the figure, when electric current flows in the coil 13 and moves the valve to the position 121, the air in the chamber 25 is sucked out through the small diameter hole of the check valve 138 and increases the time required before the vacuum pressures in the vacuum tank 23 and the chamber 25 become equal. However, it is possible to increase the moving speed of the piston 26 by sucking out the air in the chamber 25 in a very short time by having the check valve 138 open the circuit despite the pressure of the spring 139 with electric current flowing in the emergency braking circuit or speed control circuit.

When the electric current in the coil 13 is broken, the valve of the switch-over valve 15 moves automatically to the position 120 and air under the atmospheric pressure is sent into the chamber 25 through the passage pipe 16. At this time, the difference between the pressures before and after the check valve 138 makes it easy to open the valve despite the pressure of the spring 139, the pressure in the chamber 125 rising to an atmospheric pressure in a very short time and facilitating the return of the piston 26 to release the brake smoothly.

As the pilot lamp 20 is installed in parallel with the coil 13 of the brake control device 12, the lamp is lighted then electric current flows in the coil 13. The pilot lamp 20 is thus lighted as long as the brake is given braking force, no matter whether the permanent braking circuit, automatic brake control circuit or the emergency brake control circuit may have electric current flowing in it as described above.

Consequently, the function of the embodiment shown in FIGURE 2 is quite equal to that of the arrangement shown in FIGURE 1.

FIGURE 4 and FIGURE 5 show an embodiment wherein the hand brake system of the conventional type and the automatic brake control system of the present invention can work effectively without affecting each other detrimentally and without changing the driving practice heretofore observed.

FIGURE 4 shows a condition in which the hand brake lever 42 has been pulled in the direction of 44 with 43 as a fulcrum, while the braking power device 24 is deactivated and the traction rod 28 is in the position moved opposite to the direction of the arrow 31. The operation of 42 pulls the braking cord 36 in the direction of 37, via the intermediary cord 41 and intermediary swing lever 34, and imparts braking force to the brake. As the intermediary cord 33 of the braking power device 24 is flexible, it does not resist the operation of the hand brake lever 42 in this case, bending itself as shown in the drawing.

FIGURE 5 shows a condition opposite to that shown in FIGURE 4. When the hand brake lever 42 is put in the direction opposite to that of the arrow 44 and the braking power device 24 is activated to pull the traction rod 25 in the direction of 31, pulling 36 in the direction of the arrow 37 via 29, 33 and 34 to impart braking force to the brake, the intermediary cord 41 bends itself as shown in the drawing because of its flexibility and will not resist the action of the braking power device 24.

It is also obvious from FIGURE 4 and FIGURE 5 that the hand brake lever 42 and the braking by the braking power device 24 may be effected at the same time.

As stated above, the present invention makes it possible that, as mentioned in the beginning part of the specification concerning its objects, the handling of the hand brake which requires experienced skill be carried out automatically and properly. It can therefore prevent accidents due to undesired backward movement at the time of starting on an ascending slope and due to engine stop or stall. Furthermore, it eliminates the trouble of the continuous operation of the foot brake and the complicated handling of the hand brake at the time of temporary stop at an intersection on a slope. Thus it not only reduces the fatigue of the driver but also ensures safety when the hydraulic brake system suddenly runs out of order. It makes a great contribution in this way to the safety of driving in traffic. Furthermore, the automatic brake takes effect gradually when the automobile is required to come to a stop in a normal condition, whlie it takes effect quickly when it is required to come to a sudden stop in an emergency, so that it has a highly enhanced value for practical purposes.

Needless to say, the present invention may be put to various other applications with necessary modifications without departing from the spirit of the invention; for example to application in other type of self-moving vehicle, although I have explained the contents of the present invention with reference to automobiles.

What we claim is:

1. In a motor vehicle having an engine and a throttle control and a service braking mechanism operable to engage a serivce brake and a supplementary brake, an automatic brake control comprising a first means for detecting movement of the vehicle, a second means responsive to said throttle control for detecting intended vehicle movement, actuating means for engaging said supplementary brake in response to said first and second means during the simultaneous absence of said intended vehicle movement and presence of minimal to zero vehicle movement, characterized by speed control means to selectively regulate the time interval required for said actuating means to fully engage said supplementary brake with a minimum time interval responsive upon the application of said service braking mechanism to a predetermined limit.

2. The automatic brake control of claim 1 characterized in that the application of said service braking mechanism to said predetermined limit actuates said actuating means to engage said supplementary brake independently of said first and second means.

3. The automatic brake control of claim 1 characterized by emergency brake control means responsive to said service braking mechanism for actuating said speed control means and said actuating means to engage said supplementary brake in said minimum required time and independently of said first and second means upon the application of said service braking mechanism to a predetermined limit.

4. The automatic brake control of claim 1 characterized in that said predetermined limit is a pressure quantity.

5. The automatic brake control of claim 1 wherein said vehicle includes a drive train and characterized in that said second means is also responsive to a clutch installed in said drive train for detecting intended vehicle movement.

6. The automatic brake control of claim 1 characterized in that said actuating means is pneumatically driven from said engine.

7. The automatic brake control of claim 1 characterized by a lever linked with said supplementary brake for the manual application thereof, and flexible linkage means to permit said lever and said actuating means to actuate said supplementary brake independently.

8. In a motor vehicle having an engine, a throttle control and a service brake and a service braking mechanism operable to engage said service brake and a supplementary brake, an automatic brake control comprising actuating means for actuating said supplementary brake, means for controlling said actuating means comprising a plurality of circuit closing means arranged and constructed to energize said supplementary brake upon said vehicle coming to a stop with the throttle control in engine idle position, and speed control means responsive upon the application of said service braking mechanism to a predetermined limit to minimize the time required for said actuation means to fully engage said supplementary brake.

9. In a motor vehicle having an engine and a drive train and a throttle control and a service brake and a service braking mechanism operable to engage said service brake and a supplementary brake, an automatic brake control comprising a closed loop series electric circuit including a power source and a first switch and a second switch and a first electromagnet, first means to close said first switch only during the presence of zero to minimal movement of the vehicle, second means responsive to said throttle control to close said second switch only during engine idle throttle position, actuating means for engaging said supplementary brake and activated by said first electromagnet, a second series circuit including a third switch and a second electromagnet, said second series circuit being connected in parallel with the series connection of said first and second switches and said power source, third means responsive to said service braking mechanism to close said third switch only during the application of said service braking mechanism beyond a predetermined limit, speed control means responsive to said second electromagnet for regulating the time required for said actuating means to fully engage said supplementary brake with minimum required time responsive upon the application of said service braking mechanism to a predetermined pressure limit.

10. The automatic brake control of claim 9 characterized by a fourth switch connected in parallel with the series connection of said first and second switch, a fifth switch connected in parallel with said third switch, and emergency control means responsive upon the application of said service braking mechanism to a predetermined displacement limit to close said fourth and fifth switches.

11. The automatic brake control of claim 10 characterized by selection switch disposed in said closed loop series circuit and operable to short circuit the series connection of said first and second switches.

12. The automatic brake control of claim 11 characterized by an ignition key switch disposed in said closed loop series circuit between said selection switch and said power source.

13. The automatic brake control of claim 9 characterized in that said actuating means includes a fluid driven motor, said speed control means consisting of a fluid flow restriction displaceable upon the energization of said second electromagnet.

14. The automatic brake control of claim 9 wherein a clutch is disposed in the drive train of said vehicle and characterized by a switch connected in parallel with said second switch, and means responsive to said clutch to close said latter switch only during disengagement of said clutch.

References Cited

UNITED STATES PATENTS

| | | | |
|---|---|---|---|
| 2,308,822 | 1/1943 | Murphy. | |
| 2,539,538 | 1/1951 | Hayes | 188—151.11 |
| 2,583,485 | 1/1952 | Harmon et al. | 192—311 |
| 2,725,128 | 11/1955 | Martin | 192—4 |
| 2,725,129 | 11/1955 | Martin | 192—4 |
| 2,821,275 | 1/1958 | Martin | 74—532 X |
| 2,948,570 | 8/1960 | Pease | 303—63 |
| 3,017,965 | 1/1962 | Hill | 188—151.11 X |

BENJAMIN W. WYCHE III, *Primary Examiner.*

U.S. Cl. X.R.

192—3; 188—152